J. A. SWINEHART.
PROCESS OF MAKING ELASTIC VEHICLE TIRES.
APPLICATION FILED APR. 17, 1915.
1,349,390.
Patented Aug. 10, 1920.
4 SHEETS—SHEET 1.
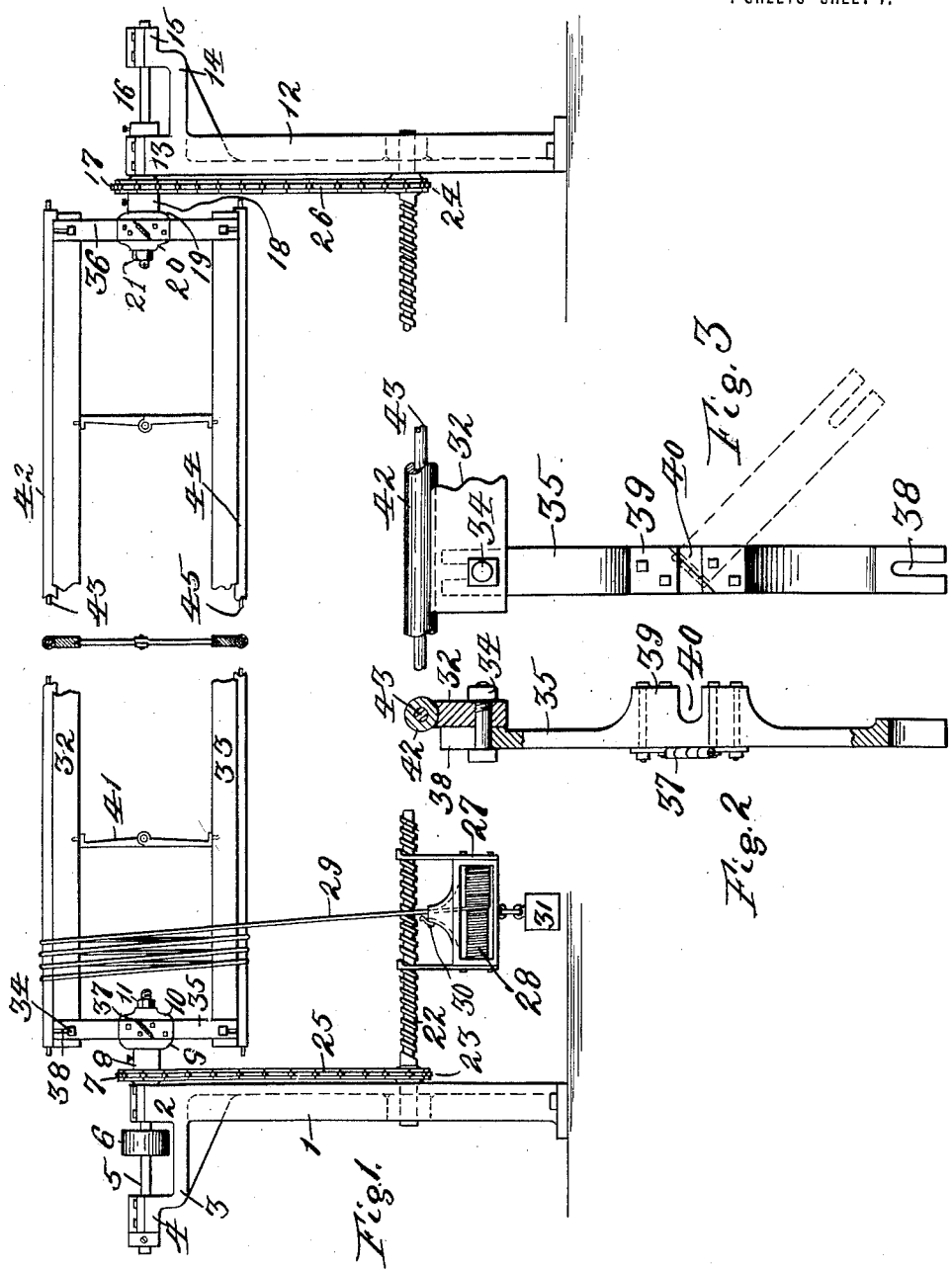
Witnesses
S. W. Brainard.
H. E. Notley.
Inventor
James A. Swinehart
By C. E. Humphrey
Attorney

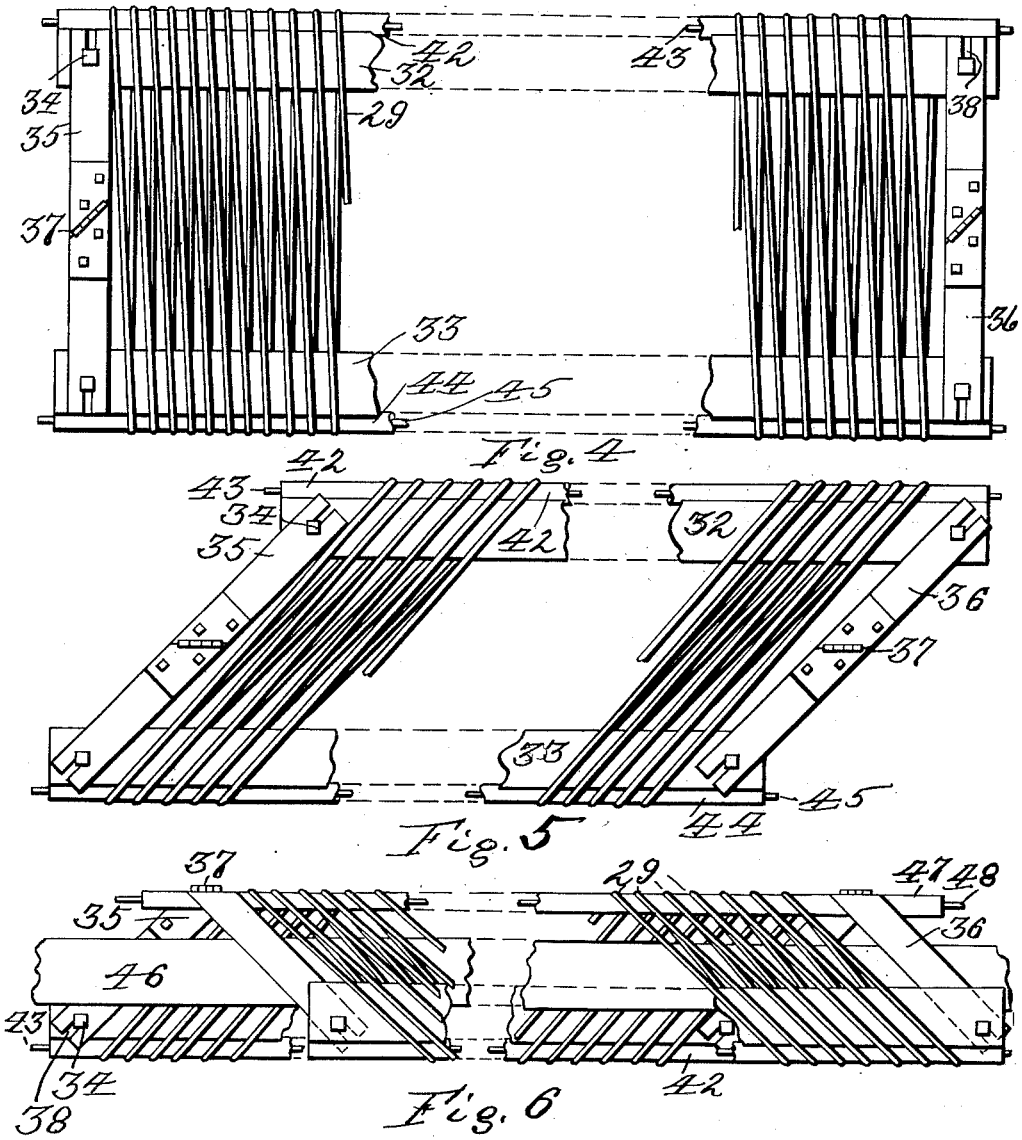

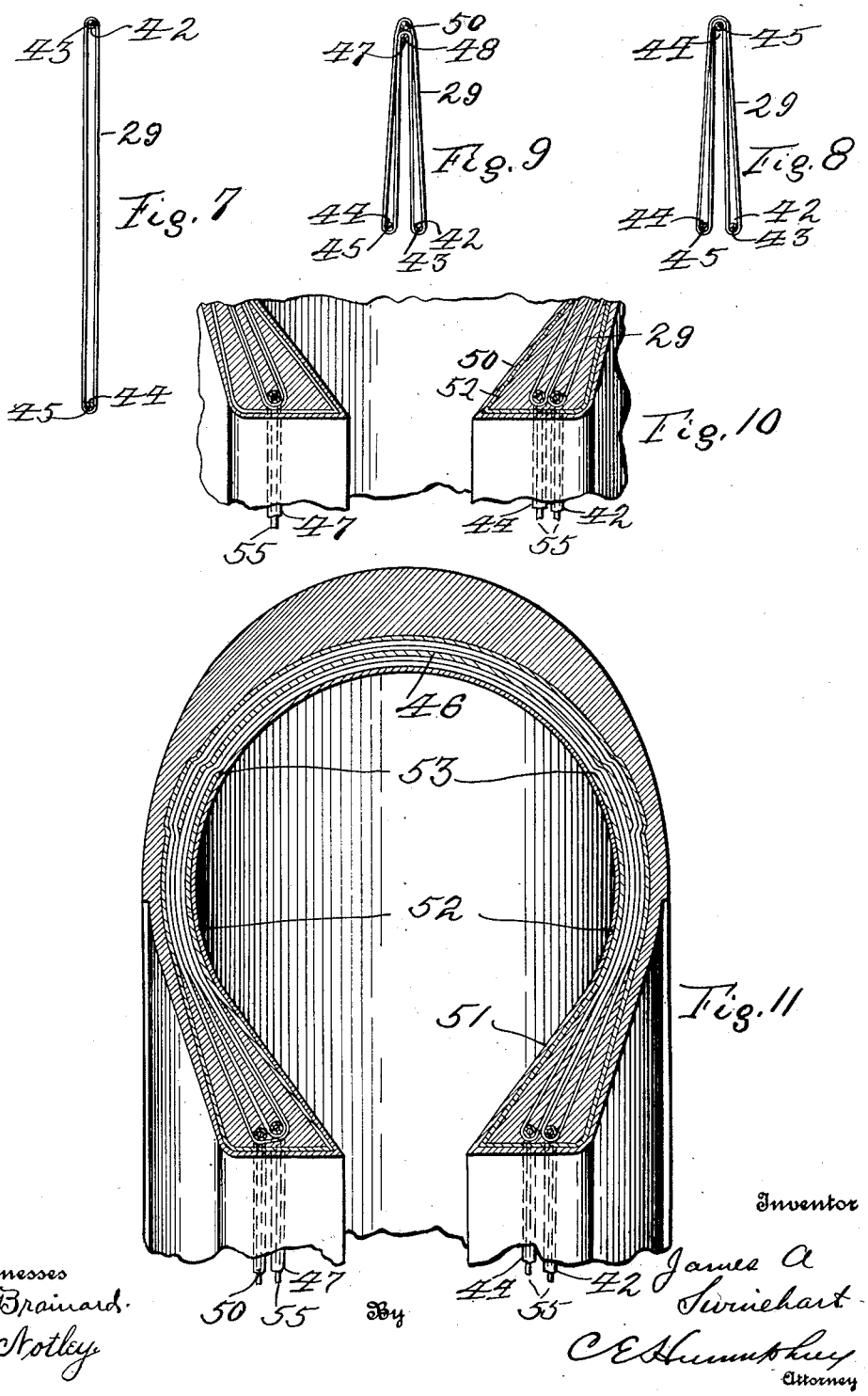

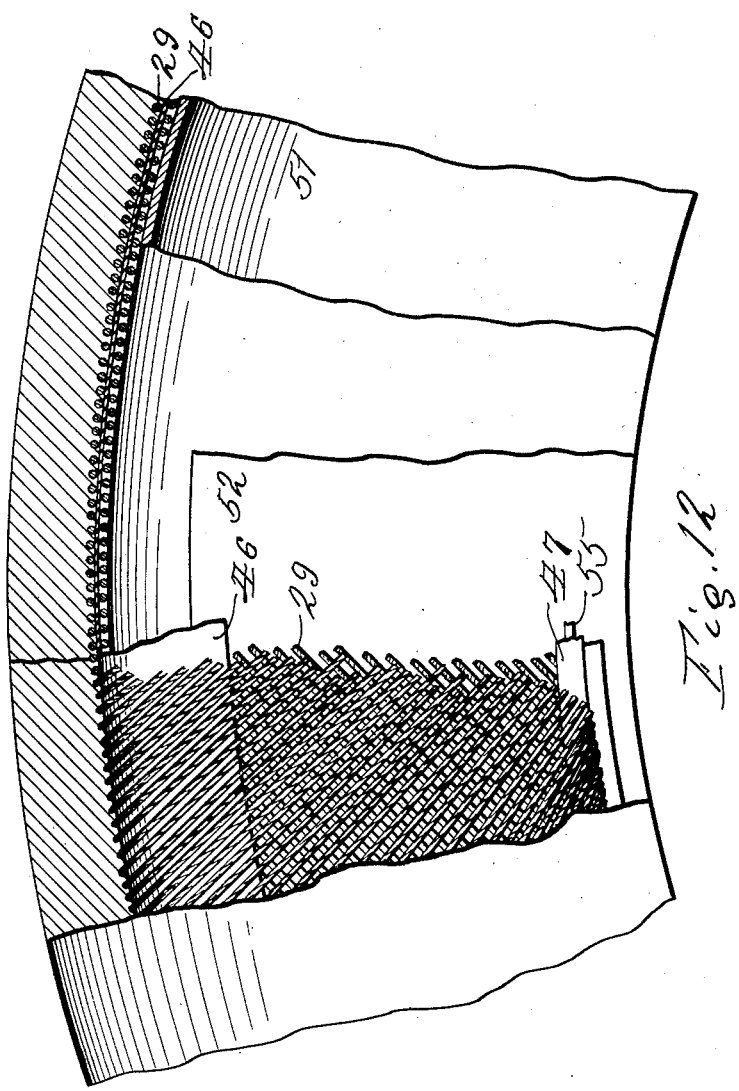

UNITED STATES PATENT OFFICE.

JAMES A. SWINEHART, OF AKRON, OHIO.

PROCESS OF MAKING ELASTIC VEHICLE-TIRES.

1,349,390.  Specification of Letters Patent.  Patented Aug. 10, 1920.

Application filed April 17, 1915. Serial No. 21,980.

*To all whom it may concern:*

Be it known that I, JAMES A. SWINEHART, a citizen of the United States, residing at Akron, in the county of Summit and State of Ohio, have invented new and useful Improvements in Processes of Making Elastic Vehicle-Tires, of which the following is a specification.

This invention relates to improvements in process for making elastic tires, especially of the pneumatic type and more particularly related to processes for constructing the outer strength-giving and wear-resisting casing or shoe therefor.

The object of the invention is to provide a process by which tires or tire shoes may be so made as to effectively strengthen them against strains, stress, and wear by incorporating in the tires a fabric formed from a flexible member, herein for brevity designated generically as a "cord," said fabric so constructed that the cord from which it is made extends from side to side of the shoe and across the tread and preferably disposed at an angle to the longitudinal line of the tire, provision being made for securely anchoring the portions of the cord which are incorporated in the lateral portions or beads of the tire.

A further object is to provide a simple and effective process by which the fabric hereinbefore referred to may be easily, cheaply and advantageously constructed and incorporated in a tire shoe, and when so positioned the fabric will possess the properties of increasing the strength and wear-resisting properties of the shoe.

In carrying out my improved process I make use of certain mechanical instrumentalities, a preferred form of which is shown in the accompanying drawings, in which similar reference numerals indicate like parts in the different figures, and in which—

Figure 1, is a view in side elevation of a machine employed;

Fig. 2, is an end elevation of a portion of the frame employed in the machine;

Fig. 3, is a side elevation enlarged of a portion of the frame;

Fig. 4, is a side elevation of a frame in the position which it assumes when the cord is wound thereon;

Fig. 5, is a view similar to Fig. 4 with the frame distorted to render the cord thereon oblique;

Fig. 6, is a view similar to Figs. 4 and 5 with the frame in its folded position;

Fig. 7, is an end view of the fabric before its incorporation in the tire and before folding;

Fig. 8, is a view similar to Fig. 7 after the folding of the fabric;

Fig. 9, is a view of a slightly modified form of the fabric shown in Fig. 8;

Fig. 10, is a transverse sectional view of the inner portion of a tire shoe with the fabric incorporated therein;

Fig. 11, is a transverse sectional view of a tire shoe having embedded therein fabric constructed in accordance with that shown in Fig. 9; and Fig. 12, is a longitudinal sectional view of a tire shoe constructed by employing the process which forms the subject matter of this invention.

Referring to the drawings in detail, the reference numeral 1 denotes an upright standard provided in the upper end thereof with a bearing 2, a laterally-extending arm 3 provided with a bearing 4. Mounted in the bearings 2 and 4 is a driving-shaft 5 provided with a belt-pulley 6. The inner end of the shaft is provided with a sprocket wheel 7 and a hub 8 on which is a head 9. The inner end of the shaft 5 is threaded and provided with a shiftable collar 10 held in place by a nut. In alinement with and opposite the standard 1 is a standard 12 provided with a bearing 13 and bracket 14 having a bearing 15. Mounted in the bearings 13 and 15 is a shaft 16 in alinement with the shaft 3 and bearing a sprocket wheel 17 and a hub 18 provided with a head 19. The inner end of the shaft 16 is threaded and provided with a shiftable collar 20 held in position by a nut 21. Extending between the standards 1 and 12 and below the shafts 5 and 16 is a threaded shaft 22 which bears a sprocket wheel 23 near one end and a sprocket wheel 24 near the opposite end. Extending between the sprocket wheel 23 and the sprocket wheel 7 on the shaft 5 is a sprocket chain 25, and extending between the sprocket wheel 24 and the sprocket wheel 17 on the shaft 16 is a sprocket chain 26. Suspended on the shaft 22 and adapted to travel longitudinally thereof as the shaft is rotated is a bobbin carrier 27 provided with a spool or bobbin 28 on which is wound a flexible member such for instance, as a cord 29 which passes upwardly through a suitable outlet in the carrier and as it passes therethrough it is engaged by a tension device 30. The bobbin carrier is preferably provided with counterweights 31 to hold the same in position during the rotation of the spool or bobbin 28.

Adapted to be supported by the mechanism just described is a frame comprising a pair of longitudinally-extending bars 32 and 33 the outer faces of which are provided with concave grooves for a purpose to be later described, and these bars are provided near their ends with headed pins 34. Extending between the ends of the bars 32 and 33 are cross bars 35 and 36 identically similar in construction and each comprising two members, pivotally united mid-way their ends by inclined hinges 37 and each provided at its ends with longitudinal slots 38 to receive the pins 34. The bars 35 and 36 are provided near their centers with thickened portions 39 through which extend transverse grooves 40. These frames are mounted in the machine by loosening the nuts 11 and 21 to permit the collars 10 and 20 to be shifted away from the heads 9 and 19 and the frame is positioned by shifting the frame laterally in such a manner as the shafts 5 and 16 are received in the grooves 40 in the two cross bars 35 and 36, after which the nuts 11 and 21 are screwed to place, clamping the bars 35 and 36 between the head 9 and collar 10 at one end and between the head 19 and collar 20 at the other end. As the bars 32 and 33 will be of considerable length and of comparatively light material I prevent their being drawn toward each other by means of a plurality of hinged braces 41 and which are provided with pins at their ends for engagement in suitable apertures in the bars 32 and 33.

Before the described instrumentality is utilized for the manufacture of fabric for the building of a tire or shoe in accordance with the process which forms the subject matter of this invention, there is placed in the groove in the outer face of the bar 32 a small rubber tube 42 through which extends a stiffening wire 43 and in the groove in the outer face of the bar 33 a similar tube 44 through which extends a stiffening wire 45. The first step in the process of manufacturing fabric by which the tire is to be constructed or reinforced consists in securing the end of the cord 29 to the frame and then revolving the latter on its axis by applying power to the pulley 6 which causes the two shafts 5 and 16 to revolve in unison in the same direction, and as the frame revolves it winds the cord 29 spirally about the two tubes 42 and 44. The degree of inclination of the spiral winding will be governed by the pitch of the thread on the shaft 22, the cord being fed from the bobbin 28 which travels along the shaft 22 until a complete winding of the cord has been made on the frame.

The frame is then removed from the machine and will be in substantially the condition shown in Fig. 4 with the winding of the cord 29 extending from one end to the other and it may be stated that the length of the frame will be approximately equal to the circumferential length of the tire or shoe in connection with which the fabric is to be employed. The bars 32 and 33 of the frame are then given a longitudinal shifting movement in opposite directions to cause the frame to assume the appearance shown in Fig. 5, thereby causing the various convolutions of the cord 29 to lie in positions oblique to the longitudinal axis of the frame. A strip of rubberized fabric 46 is then laid along one face of the convolutions and approximately equi-distant between the longitudinal axis of the distorted frame and one of the rubber tubes and caused to adhere thereto by reason of its adhesive nature. A third rubber tube 47 reinforced by an inner wire or core 48 is then led along the longitudinal central line of the frame and in contact with the spiral convolutions of the cord 29 after which one portion of the frame embodying for instance, the bar 32 and the portions of the bars 35 and 36 which are connected therewith are folded or are swung on the hinges 37 to bring the rubber tube 42 into substantial contact with the rubber tube 44 so that the frame will assume the appearance shown in Fig. 6. When the frame is in this position it will be seen that approximately one-half of the convolutions of the cord 29 extend obliquely in one direction and the other half obliquely in the other direction, so as to cause the first convolutions to lap the other convolutions at approximately right angles and with the intervening strip of fabric 46 disposed between them. The frame is then removed leaving the fabric which comprises the rubber tube 47 with its reinforce 48 along one side and the two rubber tubes 42 and 44 with their reinforces 43 and 45 respectively along the opposite side and with the strip of fabric 46 positioned between the folded layers of cord and centrally disposed between the tube 47 on one side and the tubes 42 and 44 on the other side.

In constructing the modified form of fabric such as is shown in Figs. 9 and 11, a supplemental reinforce 50 is employed and is positioned within the convolutions and extending centrally of the frame when it is in the position shown in Fig. 5, after which the reinforce 47 is positioned as before described and when the two portions of the frame are bent together as shown in Fig. 6, the reinforce 50 will lie between the portions of the convolutions and in juxtaposition to the member 47, as clearly shown in Figs. 9 and 11.

The reinforces 43, 45, 48 and 50 usually consist of stiff or rigid wires, and are used to sustain the tubes in which they are placed, but are not adapted for use in connection with a tire or tire shoe, and hence, after the fabric has been formed these reinforcing wires are withdrawn and flexible members, such for instance as wire ropes 55, are drawn into the tubes and are incorporated with the tubes in the beads of the tire or tire shoe in connection with which the fabric is used.

When the fabric has been constructed as just described it is incorporated in a tire or tire shoe in the following manner and it may be pointed out that these tires or tire shoes are formed upon annular or ring cores and on which they are subsequently vulcanized, and the first step is to cover the outer face of the core with a thin layer of unvulcanized rubber gum 51, after which there is placed along both side faces of the core two strips of fabric 52 both of which extend upwardly to the points 53. The fabric constructed as described in the preceding part of this specification, is then superposed on the core with the fabric strip 46 positioned on the tread thereof and with its lateral edges overlapping the outer edges of the two strips 52 and with the reinforces 42 and 44 positioned in one bead and the reinforce 47 in the opposite bead, as clearly shown in Fig. 10, after which the tire is built up in any preferred manner. In the modification, the same method of building up a tire is employed excepting that in this case the reinforce 47 in the bead on one side will be supplemented by the auxiliary reinforce 50, as shown in Fig. 11. The usual curing and removing of the tire from the mold is carried out and the tire or tire shoe is ready for use.

It will be noted that in utilizing this process for the production of a fabric sheet which is ultimately incorporated in a tire or tire shoe, advantage is taken of an easy and simple method by which the fabric may be constructed and incorporated in the tire, and which when incorporated consists of a plurality of spiral convolutions extending from a reinforce in one bead across the tread in a diagonal direction to the opposite side and back to the first bead so that the ends of the convolutions are held securely in place by the reinforces in the lateral beads of the tire or shoe and the various members of each layer are in spaced relation and in parallelism and further the members of each layer extend across each other at approximately right angles and all diagonal to the longitudinal axis of the tire.

I claim:

1. That improvement in methods for making a tire or tire-shoe which consists in forming a flattened tube-like fabric by means of a series of convolutions of cord wrapped helically about a pair of spaced longitudinally-extending parallel tubes containing reinforcing members, shifting one tube longitudinally to cause the convolutions to lie oblique thereto, replacing said reinforcing members by stiffening members and incorporating said fabric in a tire or tire shoe with the stiffened tubes positioned in the beads of the tire or tire-shoe and with the convolutions extending across the tread portion thereof.

2. That improvement in methods for forming tires or tire shoes which consists in forming a flattened tube-like fabric of spiral convolutions of cord wrapped in a parallelism about a pair of spaced longitudinally-extending members, shifting the position of one of said members longitudinally to cause said convolutions to lie oblique to the axis of the tubes, folding said tube-like member at its median portion over a third member and positioning said tube-like member in a tire or shoe with the reinforcing members positioned in the beads of said tire or shoe and with the convolution of cord extending across the tread thereof.

3. That improvement in methods for forming tires or tire shoes which consists in forming a flattened tube-like fabric from a cord wrapped spirally about a pair of spaced tube-like members, inclining said convolutions so that they lie oblique to the longitudinal axis of said fabric, folding said fabric along its median line and around a third member, and positioning said fabric in the body of a tire or tire shoe with the members embedded in the beads of the tire or shoe.

4. That improvement in methods for forming tires or tire shoes which consists in forming a flattened tube-like fabric by means of spiral convolutions of cord wrapped about a pair of spaced tubes, shifting the position of one of said tubes to cause the convolutions to lie oblique to said tubes, folding said fabric at approximately the median line thereof around a reinforcing member, inserting reinforcing members in said tube and finally incorporating said member in a tire or tire shoe with the tubes and member disposed in the beads of the tire or shoe.

5. That improvement in methods for forming tires or tire-shoes which consists in forming a flattened tube-like fabric from a cord wrapped spirally about a pair of spaced tube-like members, inclining said convolutions so that they lie oblique to the axis of said fabric, placing a strip of fibrous material on said fabric between the center and one edge thereof, folding said fabric together around a third member placed near the central line of said fabric, and positioning said fabric in the body of a tire or tire-shoe with the third member positioned in one bead, the two tube-like members in the other bead and with the fibrous strip disposed at the tread of the tire or shoe.

6. That improvement in methods for forming tires or tire-shoes which consists in forming a flattened tube-like fabric by means of a plurality of spiral convolutions of cord wrapped about a pair of spaced suitably-supported tubes, shifting the position of one of said tubes to cause the convolutions to lie oblique to the fabric, folding said fabric around a reinforcing member positioned along the median line of said fabric, inserting other reinforcing members in said tubes and finally incorporating said fabric in a tire or tire-shoe with the tubes and reinforcing members disposed in the beads of a tire or shoe.

In testimony whereof I have hereunto set my hand.

JAMES A. SWINEHART.